Aug. 17, 1937.  E. T. PARSONS  2,090,598
DOUGH WORKING AND CONVEYING APPARATUS
Filed April 24, 1936  5 Sheets-Sheet 1
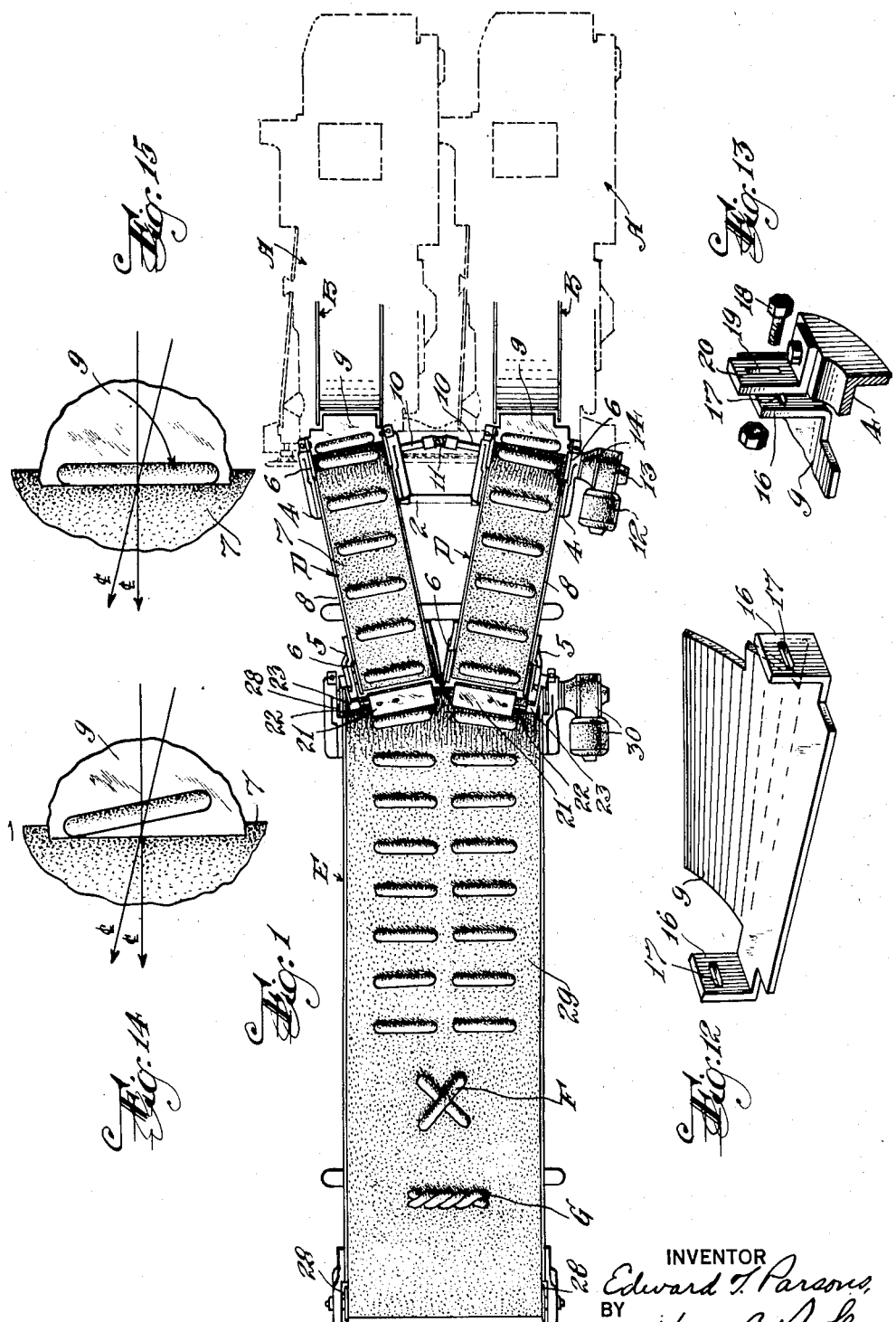
INVENTOR
Edward T. Parsons,
BY
Harry B. Rook.
ATTORNEY

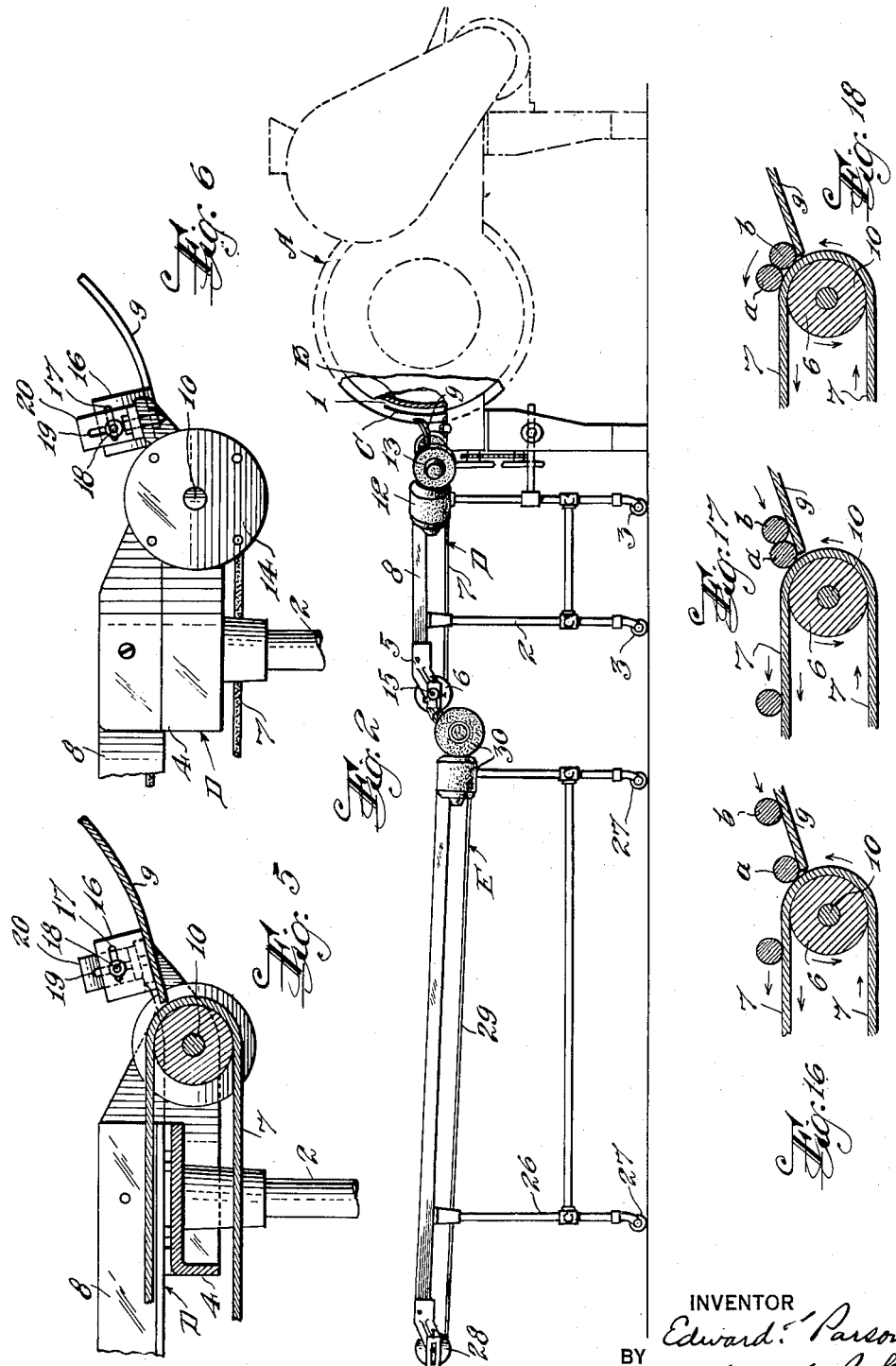

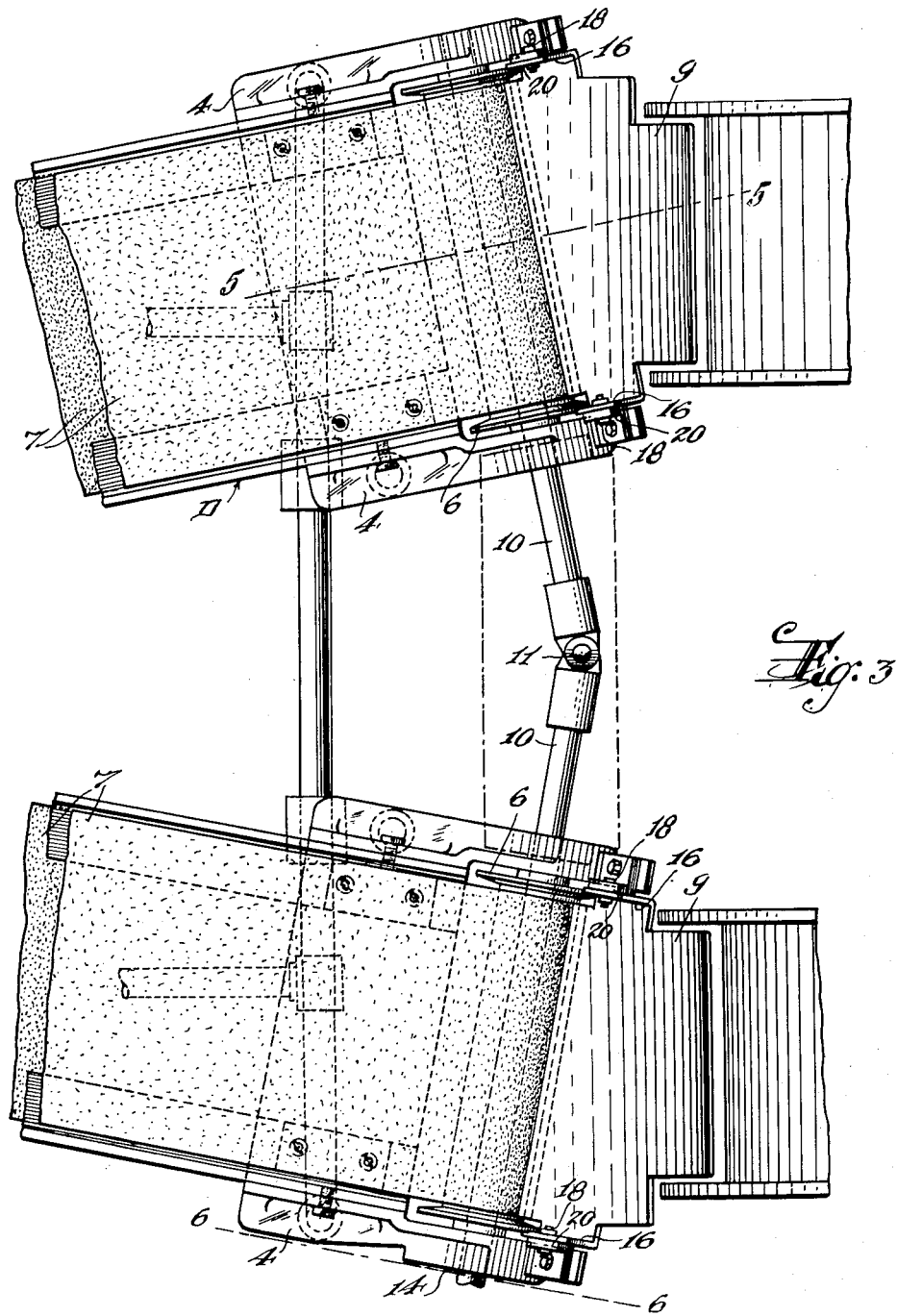

Aug. 17, 1937.   E. T. PARSONS   2,090,598
DOUGH WORKING AND CONVEYING APPARATUS
Filed April 24, 1936   5 Sheets-Sheet 4
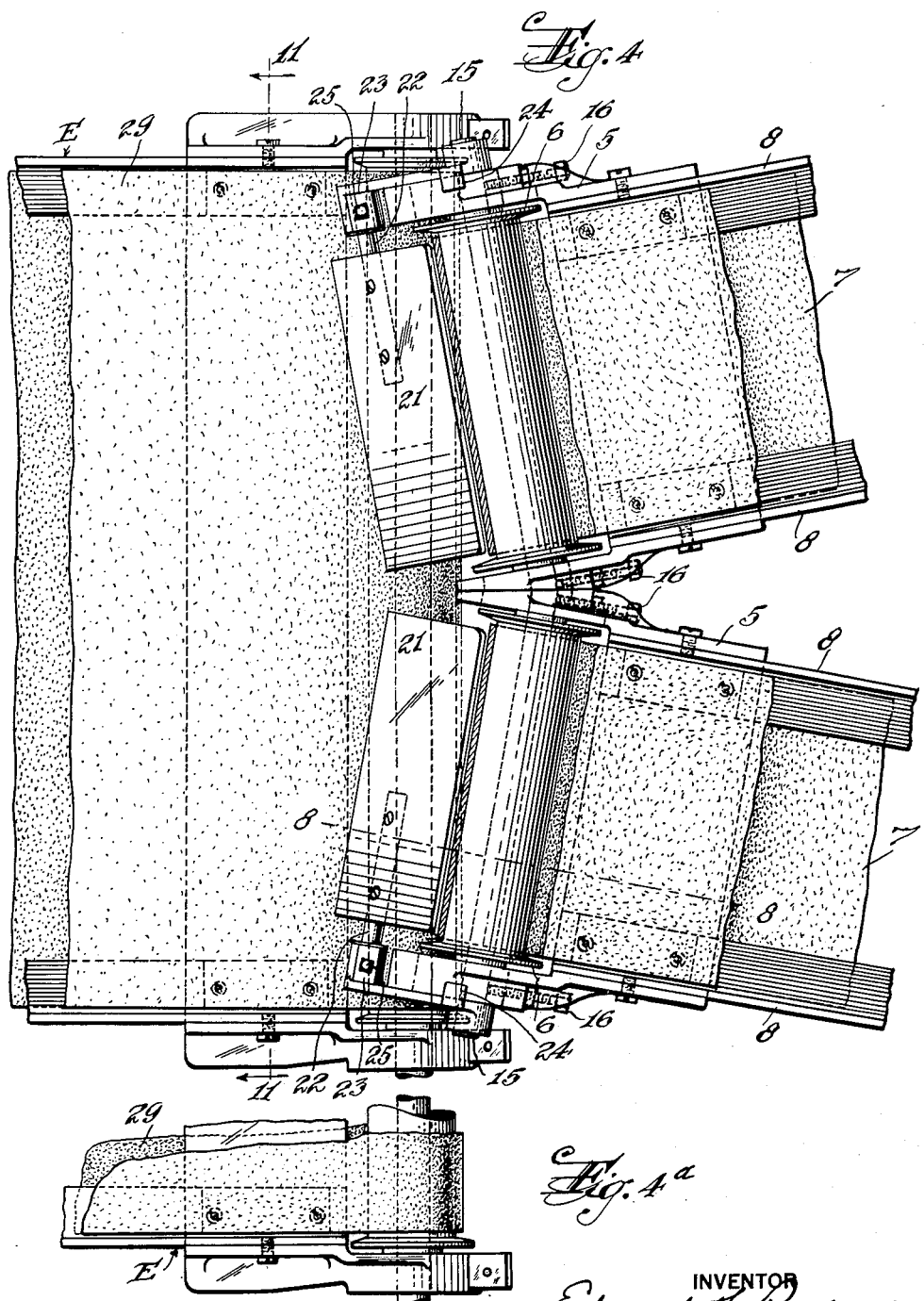
INVENTOR
Edward T. Parsons
BY
Harry B. Rook
ATTORNEY

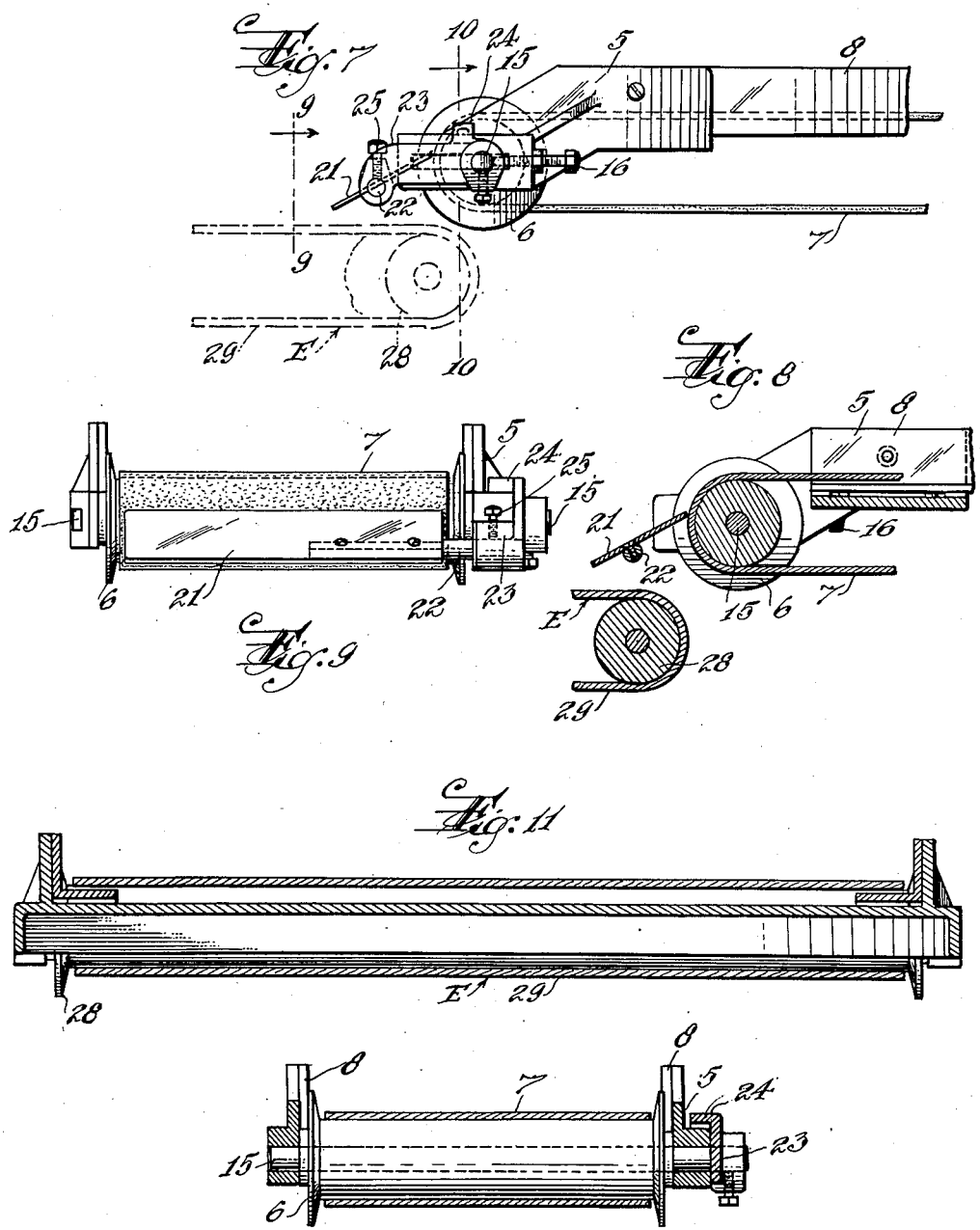

Patented Aug. 17, 1937

2,090,598

UNITED STATES PATENT OFFICE 2,090,598

DOUGH WORKING AND CONVEYING APPARATUS

Edward T. Parsons, Upper Montclair, N. J., assignor to Thomson Machine Company, Belleville, N. J., a corporation of New Jersey Application April 24, 1936, Serial No. 76,097

4 Claims. (Cl. 198—20)

This invention relates particularly to apparatus for producing so called "twisted" loaves of dough, although the invention is susceptible of use for other purposes as will hereinafter appear.

Generally a loaf of dough for making bread consists of a single roll of dough of such diameter and length as to form a loaf of a given more or less standard weight. A "twisted" loaf is formed of two rolls of dough twisted together, and to make the "twisted" loaf of the desired standard size and weight, each roll naturally must be smaller than the single roll which is used alone for a loaf.

The large dough rolls are generally made in loaf molding machines of the general nature shown in Patent No. 701,646, and such machines may be adjusted to make rolls of large or small diameter so that they may be used for producing small rolls for "twisted" loaves.

However, such machines have a predetermined maximum capacity, that is, are capable of producing a predetermined maximum number of rolls per minute. Accordingly, such a machine is capable of producing only half as many "twisted" loaves as single roll loaves per unit of time, because each "twisted" loaf includes two rolls of dough.

Prime objects of my invention are to provide novel and improved apparatus for producing "twisted" loaves at approximately the same rate as single roll loaves are now produced; and thus to utilize two molding machines, for example of the known type mentioned, each to produce small rolls for a "twisted" loaf at the normal rate of production, for example about sixty per minute, in combination with novel and improved means for receiving the rolls simultaneously from both molding machines and arranging them at a common point or station to facilitate handling and twisting of the rolls into loaves by an operator.

Another object is to provide a combination of two dough molding machines for producing cylindrical rolls of dough and having horizontally spaced discharge openings for the rolls, a main conveyor for receiving the rolls from both molders with the rolls from each molder arranged in a row in side by side relation to the row of rolls from the other molder, and a transfer conveyor for receiving the rolls from each molder and depositing them on the main conveyor, whereby the rolls are positioned in close relation so that two rolls may be conveniently picked up and manually twisted into a twisted loaf.

A further object is to provide a novel and improved construction and combination of a main panning conveyor upon which the rolls may be conveniently arranged for twisting into loaves, and a transfer conveyor for receiving two series of rolls, one from each of two machines, and depositing them on the main conveyor.

Other objects are to provide a novel and improved transfer conveyor which shall include a conveyor for receiving rolls from each molder and which can be easily transported or rolled upon the floor and interchangeably used with different pairs of dough molding machines; to provide such a transfer conveyor which shall include a conveyor belt and a novel and improved bridge plate for conducting the rolls from the molder to the belt in properly spaced and alined relation on the conveyor belt; and to obtain other advantages and results as will be brought out by the following description.

Referring to the accompanying drawings in which corresponding and like parts are designated by the same reference characters, Figure 1 is a schematic top plan view of a pair of dough molding machines and a conveyor mechanism embodying my invention.

Figure 2 is a schematic side elevation of the dough molding machines and conveyor mechanism with a portion of one of the molding machines shown in section for clearness in illustration.

Figure 3 is a fragmentary plan view on a large scale of the receiving end of the transfer conveyor.

Figure 4 is a similar view of the discharge end of the transfer conveyor and the receiving end of the main or panning conveyor.

Figure 4ᵃ is a fragmentary view of one end of the panning conveyor shown in Figure 4.

Figure 5 is a fragmentary vertical sectional view on the line 5—5 of Figure 3.

Figure 6 is a fragmentary side elevation of the transfer conveyor on the line 6—6 of Figure 3 showing the driving motor removed.

Figure 7 is a fragmentary side elevation of the discharge end of the transfer conveyor.

Figure 8 is a vertical sectional view on the line 8—8 of Figure 4.

Figure 9 is a front elevation from the line 9—9 of Figure 7.

Figure 10 is a transverse sectional view on the line 10—10 of Figure 7.

Figure 11 is a transverse sectional view on the line 11—11 of Figure 4.

Figure 12 is a detached perspective view of the bridge plate.

Figure 13 is a fragmentary composite perspective view of the mounting for the bridge plate.

Figures 14 and 15 are schematic plan views showing the manner in which the bridge plate and transfer conveyor belt cooperate to properly space and aline the rolls on the conveyor, and Figures 16, 17 and 18 are sectional schematic views showing the manner of cooperation of the bridge plate and transfer conveyor belt in positioning the rolls of the conveyor.

Specifically describing the illustrated embodiment of the invention, the reference character A designates two dough molding machines which may be of the general nature shown in Patent Number 701,646 and include a molding drum B which cooperates with a compression plate C for rolling and kneading a roll of dough between them. These machines are disposed on a floor or other suitable support in side by side relation, and the rolls of dough are discharged from the openings 1 between the upper ends of the compression plates and the corresponding drums (see Figure 2) successively and in spaced relation at about the same rate, these openings being juxtaposed and horizontally spaced from each other.

In accordance with the invention, the rolls of dough when they are discharged from the openings 1 fall by gravity to a transfer conveyor D which in turn deposits the rolls on a main panning conveyor E where the rolls may be picked up by an operator and twisted into "twisted" loaves and placed in baking pans or other suitable receptacles.

The transfer conveyor D includes two conveyor sections, one for each dough molding machine A, the two sections being mounted on a common frame. As shown, the conveyor includes a stand 2 which may be composed of pipe properly fitted together and mounted on casters 3 for easy movement over a floor or the like. On the top of the stand 2 are mounted two bearing plates 4 and 5 for each conveyor section, and in each bearing plate is mounted a roller 6 over which passes an endless conveyor belt 7. The respective plates 4 and 5 of each conveyor section are shown as connected by angle bars 8 which also serve as supports for the upper reach of the corresponding belt 7. The conveyor sections are disposed in approximately a horizontal plane with their receiving ends spaced apart a distance corresponding to the spacing of the discharge openings 1 as clearly shown in Figures 1 and 3, the sections converging in a horizontal plane so that their discharging ends are in close relation so as to discharge the rolls from the respective sections in close side by side relation upon the panning conveyor E so that the rolls may be conveniently picked up by an operator.

With this arrangement, the axes of the rollers 6 of the conveyor sections are angularly disposed in substantially the same horizontal plane, but it is desirable to drive both conveyor sections by the same driving mechanism. This is simply and conveniently effected by connecting the adjacent ends of the shafts 10 of the rollers 6 at the receiving ends of the conveyors with a universal coupling 11, and driving one of the shafts with the known type of combined electric motor 12 and speed reducing mechanism 13 which may be mounted on one of the plates 4 of the conveyor frame. Preferably, this plate 4 has a bracket flange 14 coaxial with the corresponding shaft 10 and to which the driving mechanism 12, 13 may be bolted, and the driving element of the speed reducing element 13 is connected to the shaft 10 in known manner.

The rollers 6 at the discharging ends of the conveyor are mounted on shafts 15 which are journaled in slide bearings in the respective plates 5 and are adjustable by set screws 16 so as to maintain the respective belts 7 under proper tension.

For conducting the rolls of dough from the discharge openings 1 onto the respective conveyor sections, I have shown a bridge plate 9 between each discharge opening and the corresponding conveyor. Preferably the bridge plates are related to the adjacent rollers of the conveyor sections so as to form pockets at the junctures of the bridge plates with the conveyor belts as clearly shown in Figures 5, 14, 15, and 16 to 18, inclusive, the edges of the bridge plates being below the plane of the upper reaches of the respective belts. The bridge plates are adjustable so that the depth of these pockets may be varied to ensure that each roll of dough a will enter the pocket and remain there in frictional contact with the corresponding conveyor belt, as shown in Figures 15 and 16, until the next succeeding piece b abuts the first piece as shown in Figure 17, and the weight of the second mentioned piece will increase the frictional contact between the first piece and the conveyor belt so that the first piece will be drawn out of the pocket onto the conveyor belt as shown in Fig. 18. Due to the converging relationship of the conveyor sections, it will be seen that the rollers 6 and the receiving ends of the conveyors will be angularly disposed to the discharging openings 1 and it is desirable to have the pieces a of dough disposed in parallel relation to each other and approximately perpendicular to the sides of the conveyor belts. The pockets formed between the rollers 6 and the bridge plates 9 cause the rolls to adjust themselves into this position with respect to the conveyor belts as shown in Figures 14 and 15 which illustrate respectively the roll of dough as it reaches the pocket and the roll after it has adjusted itself to the conveyor.

Accordingly the bridge plates cooperate with the respective conveyor sections so that the rolls of dough are directed to the respective conveyor sections in properly spaced and parallel relation in a row.

For adjustably mounting the bridge plates 9, I have shown each bridge plate with integral ears 16 at opposite ends having slots 17 to receive bolts 18 which are mounted in slots 19 in angle brackets 20 secured to the respective plates 4. With this construction, the bridge plates may be both horizontally and vertically adjusted with respect to the corresponding conveyor belts.

The conveyor belts 7 of the transfer conveyor are driven at a speed to carry the rolls of dough at approximately the same rate at which they are normally discharged from the molding machines, and the transfer conveyor deposits the two series of rolls of dough by gravity upon the panning conveyor E with the rolls of each series arranged in a row closely adjacent and approximately parallel to the row of rolls of the other series, as clearly shown in Figure 1. The panning conveyor E is of a width to conveniently accommodate the two rows of rolls and to enable an operator to stand at one side of the conveyor and conveniently pick up two of the rolls and first cross them as indicated at F and then twist them into a "twisted" loaf as indicated at G. The conveyor E conveys the rolls at approximately the same rate at which they are discharged from the transfer conveyor.

For guiding the rolls from the transfer conveyor sections to the panning conveyor E, I have shown a bridge plate 21 for each transfer conveyor section mounted on a rod 22 which is rotatably mounted in a bracket 23 that is in turn mounted on one end of the shaft 15 of the corresponding conveyor. Intermediate its ends the bracket 23 has a lug 24 which overlies the corresponding frame plate 5 to support the bracket arm. By rotating the rod 22 the angular relation of the bridge plate 21 to the corresponding conveyor section may be changed and the plate may be held in adjusted position by a set screw 25 in the bracket and engaging the rod.

The main conveyor E may be of any suitable construction but is shown as comprising a stand 26 mounted on casters 27 and having rollers 28 over which pass a conveyor belt 29. One of the rollers is driven by an electric motor and speed reducing unit 30 which may be identical with the unit 12, 13 hereinbefore described.

While I have shown and described the invention as embodied in a dough working and handling apparatus, it should be understood that the invention may be used in other apparatus having two juxtaposed and horizontally spaced discharge zones for pieces of material which are to be conveyed to approximately the same point or station. Also, the details of structure of the apparatus may be widely modified and changed by those skilled in the art without departing from the spirit or scope of the invention.

Having thus described my invention, what I claim is:

1. The combination of a machine having a discharge zone for discharging pieces of material in succession and spaced relation, a conveyor including an approximately horizontal belt and rollers over which the belt moves one of which is disposed adjacent said discharge opening, and a bridge plate for conducting pieces of material from said opening to said conveyor by gravity and forming a pocket between itself and said roller to receive each piece and hold it in frictional contact with said belt until the next succeeding piece abuts the first piece, the contact between said pieces then increasing the friction between the belt and the first piece so that said piece is drawn from the pocket onto the conveyor belt.

2. The combination of a machine having a discharge zone for discharging pieces of material in succession and spaced relation, a conveyor including an approximately horizontal belt and rollers over which the belt moves one of which is disposed adjacent said discharge opening, and a bridge plate for conducting pieces of material from said opening to said conveyor by gravity and having one edge portion adjacent said roller and below the plane of the upper reach of said conveyor belt so as to form a pocket to receive each piece and hold it in frictional contact with said belt until the next succeeding piece abuts the first piece, the contact between said pieces then increasing the friction between the belt and the first piece so that said first piece is drawn from the pocket onto the conveyor belt.

3. The combination of two conveyors one of which includes a frame, a belt and rollers over which the belt passes to discharge pieces of material on the other conveyor, the roller of the first conveyor having a shaft mounted in said frame, a bracket mounted on one end of said shaft, a rod rotatably adjustable in said bracket and disposed approximately parallel to said roller, and a bridge plate mounted on said rod to conduct pieces of material from said belt conveyor to the other conveyor, whereby the angular relation of said bridge plate to said conveyors can be adjusted by rotation of said rod.

4. The combination set forth in claim 2 wherein said conveyor includes a frame, and with the addition of a bracket on said frame, and a bolt and slot connection between said bracket and said bridge plate for horizontal and vertical adjustment of the bridge plate.

EDWARD T. PARSONS.